(12) United States Patent
Tezuka et al.

(10) Patent No.: US 9,887,865 B2
(45) Date of Patent: Feb. 6, 2018

(54) NUMERICAL CONTROL DEVICE HAVING FUNCTION OF CALCULATING FREQUENCY CHARACTERISTIC OF CONTROL LOOP

(71) Applicant: FANUC Corporation, Yamanashi (JP)

(72) Inventors: Junichi Tezuka, Yamanashi (JP);
Kenichi Takayama, Tamanashi (JP);
Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 309 days.

(21) Appl. No.: 14/627,527

(22) Filed: Feb. 20, 2015

(65) Prior Publication Data

US 2015/0241869 A1 Aug. 27, 2015

(30) Foreign Application Priority Data

Feb. 21, 2014 (JP) ................................ 2014-032121

(51) Int. Cl.
*H04L 27/233* (2006.01)
*G05B 19/35* (2006.01)
(Continued)

(52) U.S. Cl.
CPC .......... *H04L 27/2338* (2013.01); *G05B 11/12* (2013.01); *G05B 19/351* (2013.01);
(Continued)

(58) Field of Classification Search
CPC ...... G05B 19/00; G05B 19/251; G05B 19/33; G05B 19/351; G05B 19/371;
(Continued)

(56) References Cited

U.S. PATENT DOCUMENTS 3,395,340 A   7/1968   Anstey et al.
3,473,098 A * 10/1969   Waller ................. G05B 19/351
                                             318/594
(Continued)

FOREIGN PATENT DOCUMENTS

CN     102564411 A    7/2012
CN     102903370 A    1/2013
(Continued)

OTHER PUBLICATIONS

Luo Bing, et al, "Reconfigurable testing system for silicon micromechanical gyroscope characteristic curve based on FPGA", Journal of Chinese Inertial Technology, Oct. 2010, pp. 607-611, vol. 18, No. 5, China.

*Primary Examiner* — Crystal J Barnes-Bullock
(74) *Attorney, Agent, or Firm* — Hauptman Ham, LLP

(57) ABSTRACT

A numerical control device wherein a sinusoidal signal generated by a sine wave generation part is input by a control loop excitation part to a control loop of the control object, the input signal input to the control loop and the output signal from the control object are sampled by the data acquisition part periodically, and the sampling data is used by the frequency characteristic calculation part to calculate the frequency characteristic of the control loop to control the control object, wherein the frequency characteristic calculation part uses data obtained by inputting a sinusoidal signal obtained by shifting an initial phase of the sinusoidal signal by a phase shift part provided at a sine wave generation part by exactly a certain amount to the control loop a plurality of times to calculate the frequency characteristic of the control loop to thereby improve the measurement precision regardless of the sampling frequency.

6 Claims, 7 Drawing Sheets

(51) Int. Cl.
*G05B 19/37* (2006.01)
*G05D 3/12* (2006.01)
*G05B 19/408* (2006.01)
*G06F 5/01* (2006.01)
*G06F 1/02* (2006.01)
*G05B 11/12* (2006.01)

(52) U.S. Cl.
CPC ......... *G05B 19/371* (2013.01); *G05B 19/408* (2013.01); *G05D 3/12* (2013.01); *G06F 1/022* (2013.01); *G06F 5/01* (2013.01); *G06F 2101/04* (2013.01)

(58) Field of Classification Search
CPC ........ H03M 1/485; H03M 1/665; G05D 3/12; H04L 27/2338; Y10T 409/300896
See application file for complete search history.

(56) References Cited

U.S. PATENT DOCUMENTS

| | | | | |
|---|---|---|---|---|
| 3,490,017 A | * | 1/1970 | Bullock | G05B 19/371 341/114 |
| 3,539,789 A | * | 11/1970 | Fitzner | G05B 19/251 341/115 |
| 3,539,895 A | * | 11/1970 | McGee | G05B 19/371 318/570 |
| 3,684,874 A | * | 8/1972 | Kelling | G05B 19/371 318/571 |
| 3,701,888 A | * | 10/1972 | McDaniel | G05B 19/371 318/562 |
| 3,854,081 A | * | 12/1974 | Benaglio | G05B 19/33 318/573 |
| 4,204,257 A | * | 5/1980 | Hungerford | G05B 19/33 318/661 |
| 4,272,818 A | * | 6/1981 | McDaniel | G05B 19/351 318/603 |
| 4,342,077 A | * | 7/1982 | Passey | G05B 19/33 318/605 |
| 5,545,988 A | | 8/1996 | Sakai et al. | |
| 5,610,948 A | * | 3/1997 | Ninomiya | H04L 27/2338 329/304 |
| 6,639,976 B1 | | 10/2003 | Shellum et al. | |
| 6,996,386 B2 | * | 2/2006 | Yamanaka | H03G 3/3068 375/345 |
| 8,656,775 B2 | | 2/2014 | Sameshima | |
| 9,093,114 B2 | | 7/2015 | Ishihara et al. | |
| 2004/0179831 A1 | | 9/2004 | Tsuruta | |
| 2016/0246305 A1 | * | 8/2016 | Odai | G05B 19/00 |

FOREIGN PATENT DOCUMENTS

| | | |
|---|---|---|
| JP | 63-156202 A | 6/1988 |
| JP | 2000-278990 A | 10/2000 |
| JP | 2003-316402 A | 11/2003 |
| JP | 2013-29913 A | 2/2013 |
| TW | 566010 B | 12/2003 |

\* cited by examiner

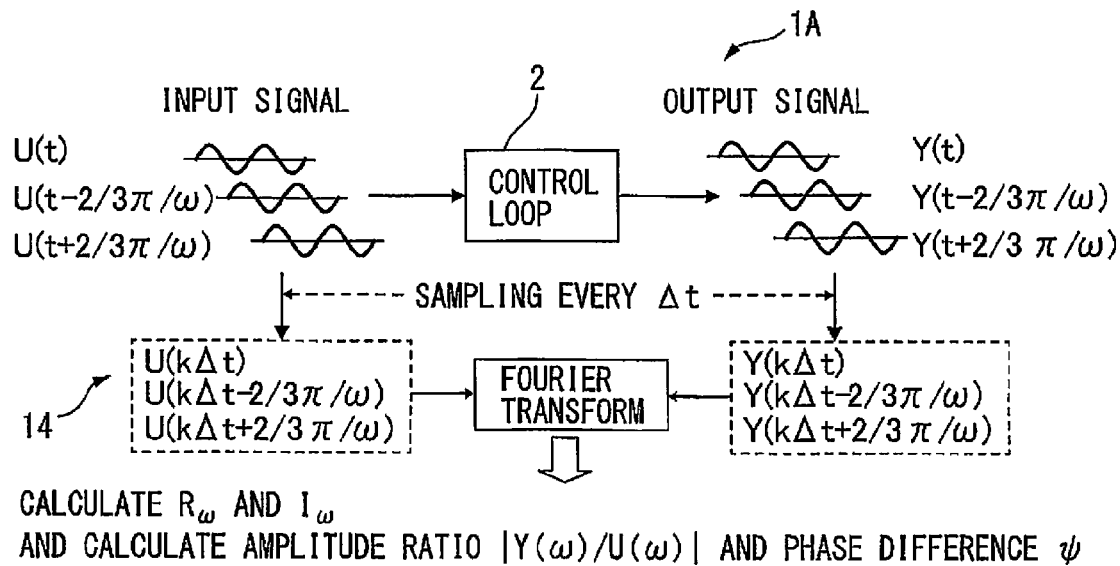

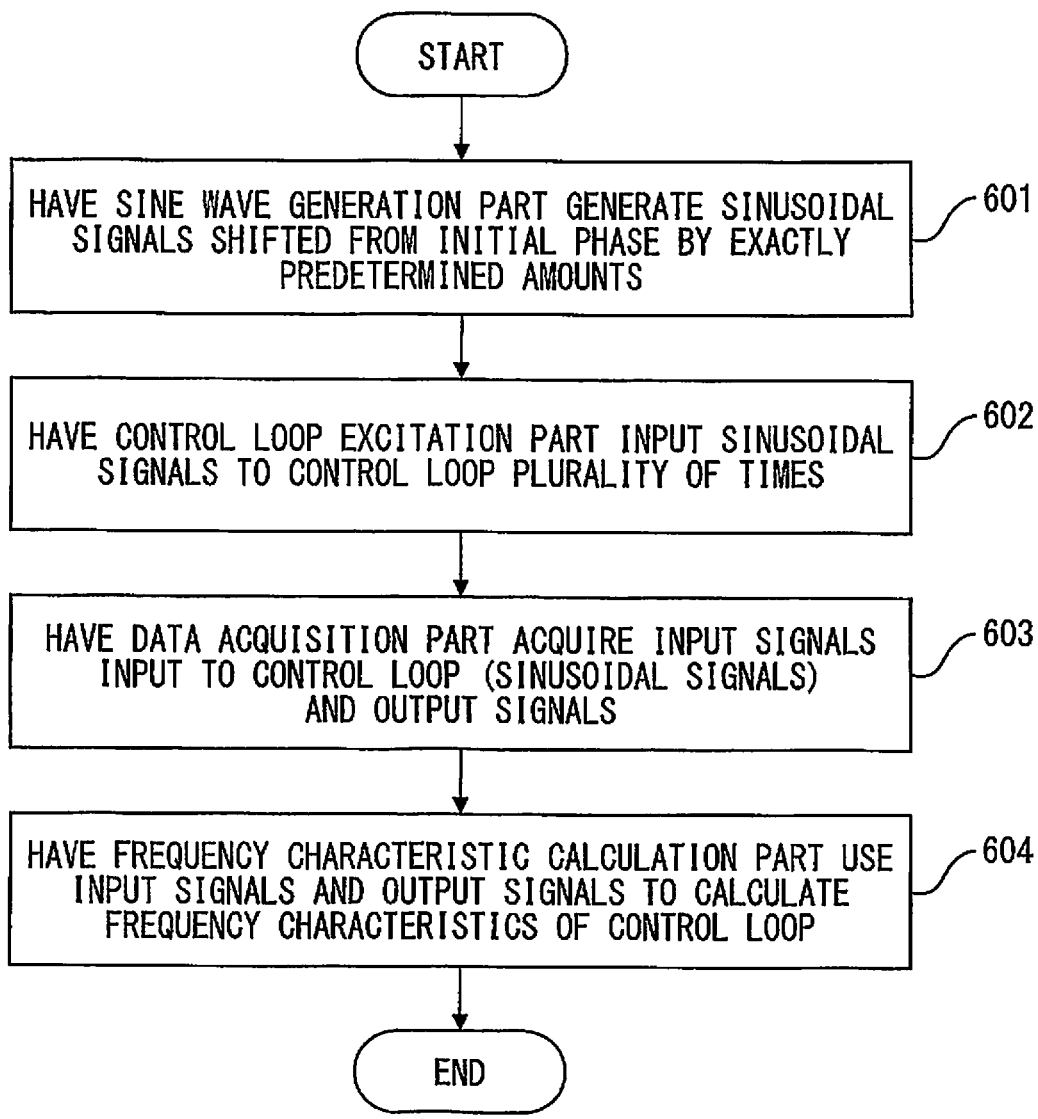

US 9,887,865 B2

NUMERICAL CONTROL DEVICE HAVING FUNCTION OF CALCULATING FREQUENCY CHARACTERISTIC OF CONTROL LOOP

RELATED APPLICATIONS

The present application claims priority to Japanese Application Number 2014-032121, filed Feb. 21, 2014, the disclosure of which is hereby incorporated by reference herein in its entirety.

BACKGROUND OF THE INVENTION

1. Field of the Invention

The present invention relates to a numerical control device which has the function of inputting a sinusoidal signal to a control loop of a numerical control device which controls a control object so as to calculate a frequency characteristic of the control loop of the numerical control device.

2. Description of the Related Art

In the past, a numerical control device which uses numerical values to control a machine tool which machines a workpiece has been known. A machine tool, for example, cuts, planes, drills, mills, grinds, or otherwise machines a workpiece and usually has built-in motors. Therefore, a motor control device which controls a motor of a machine tool by numerical values is a numerical control device in which the control object is a motor.

In a machine tool which uses a motor, the practice has been to measure the frequency characteristic (frequency response) of the motor which is connected to a load for the purpose of analysis of machine resonance as an inhibitory factor for improvement of characteristics and analysis of the response and stability of control. When measuring the frequency characteristic of a motor, the servo analyzer inputs a speed command of a sine wave into the numerical control device of the motor to which the load is connected while gradually raising the frequency. Further, a servo analyzer compares a motor speed which is obtained from a speed detector of the motor with a speed command and analyzes an amplitude ratio and phase difference. The results of measurement obtained by analysis of this servo analyzer is generally displayed as a Bode plot.

In this regard, with the method of inputting a sinusoidal signal to a speed loop of a numerical control device and calculating the frequency characteristic of the speed loop from the relationship of the input and the output, it is necessary to make the frequency gradually rise in the measurement band while performing the measurement, so there was the problem of a long measurement time. Therefore, a control device of a motor which excites the speed loop by white noise which includes the entire frequency of the speed loop and thereby eliminates the trouble of changing the frequency and enables measurement of the frequency characteristic in a short time is disclosed in Japanese Patent Publication No. 2000-278990A.

However, the control device of the motor which is disclosed in PLT 1 uses white noise as the signal which is input to the speed loop. Waveform changes in white noise depending on the generating pattern, so there is the issue that it is difficult to improve the measurement precision in the high frequency region.

SUMMARY OF INVENTION

In one aspect, the present invention has as its object the provision of a numerical control device which has the function of calculating the frequency characteristic of a control loop and which can improve the measurement precision in a high frequency region.

According to one aspect of the present invention, there is provided a numerical control device which controls at least one control object which comprises a sine wave generation part which generates a sinusoidal signal, a control loop excitation part which inputs a sinusoidal signal which is output from the sine wave generation part to a control loop of the control object, a data acquisition part which samples an input signal which is input to the control loop and an output signal which the control object outputs at a certain period, a frequency characteristic calculation part which uses sampling data of the input signal and output signal to calculate the frequency characteristic of the control loop, and a phase shift part which shifts the phase of the sinusoidal signal, wherein the numerical control device uses data obtained by inputting a sinusoidal signal having a predetermined phase as an initial phase and a sinusoidal signal having the initial phase shifted by exactly a certain amount to the control loop a plurality of times to enable the frequency characteristic calculation part to calculate the frequency characteristic of the control loop.

According to a numerical control device of one aspect of the present invention, it is possible to input a signal of the same frequency but having a phase shifted from the initial phase a plurality of times and use sampling data of the same to secure two points or more of sampling data in 1 period and improve the measurement precision in the high frequency region.

BRIEF DESCRIPTION OF DRAWINGS

The present invention will be understood more clearly by referring to the following attached drawings.

FIG. 4A is an explanatory view which shows a routine by which the numerical control device of the present invention calculates a frequency response of a control loop.

FIG. 4B is a view which shows an equation which shows an input signal which is shown in FIG. 4A.

FIG. 4C is a view which shows an equation which shows an output signal which is shown in FIG. 4A.

FIG. 6 is a flow chart which shows an operation of the numerical control device which is shown in FIG. 3.

DETAILED DESCRIPTION

Figure 1A:
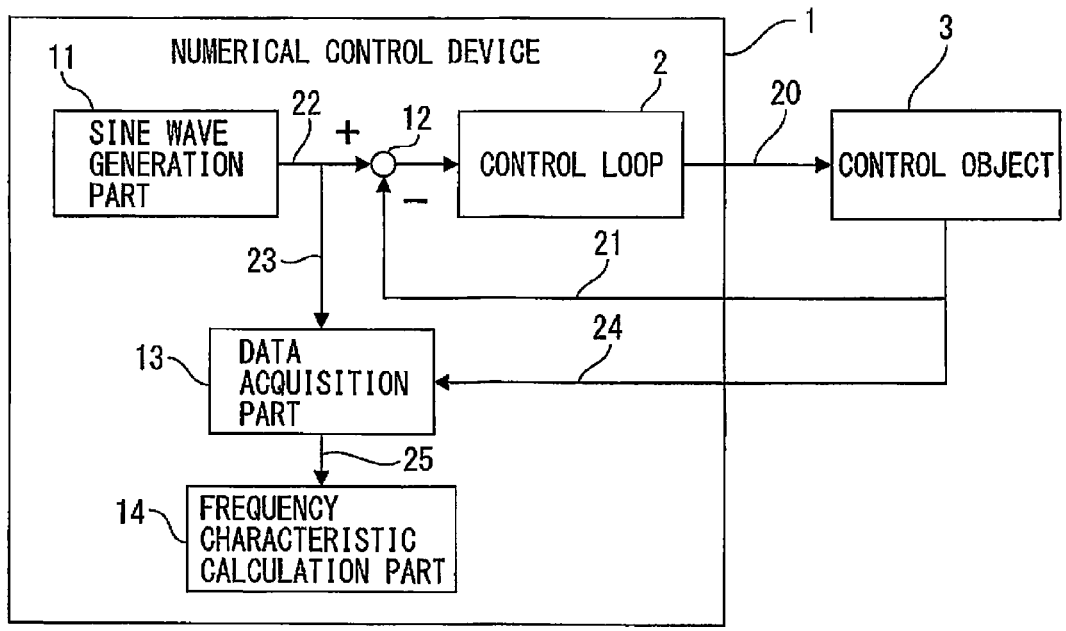
FIG. 1A is a block diagram of a numerical control device of the comparative art which controls a control object.

Below, referring to the drawings, a numerical control device which has the function of calculating a frequency characteristic of a control loop will be explained. However, it will be understood that the present invention is not limited to the drawings or the embodiments explained below. In the figures, the same component elements are assigned the same reference notations.

Here, before explaining embodiments of the present invention, the method of calculating the frequency characteristic in a numerical control device up to now will be explained using FIG. 1A to FIG. 2B.

FIG. 1A is a block diagram which shows one example of a numerical control device 1 of the comparative art which controls a control object 3. The numerical control device 1 of this example controls a single control object 3, but there may also be a plurality of control objects 3. The numerical control device 1 is provided with a control loop 2. A control loop 2 outputs a signal from an output signal line 20 to control the control object 3 and returns an output signal of the control object 3 as a feedback signal through a feedback signal line 21 to the control loop 2.

Further, the numerical control device 1 is provided with parts for calculating the frequency characteristic of control object 3 such as a sine wave generation part 11, control loop excitation part 12, data acquisition part 13, and frequency characteristic calculation part 14. The sine wave generation part 11 can generate a sine wave of different frequencies. The control loop excitation part 12 is provided in the middle of the feedback signal line 21. It inputs a sinusoidal signal which is sent from the sine wave generation part 11 through the circuit 22 to the feedback signal line 21 to excite the control loop 2. The data acquisition part 13 receives as input a sinusoidal signal from the sine wave generation part 11 through a branch circuit 23 of the circuit 22 and receives as input the output signal of the control object 3 through a branch signal line 24 of the feedback signal line 21. The data acquisition part 13 is connected by an output circuit 25 to the frequency characteristic calculation part 14.

Figure 2A:
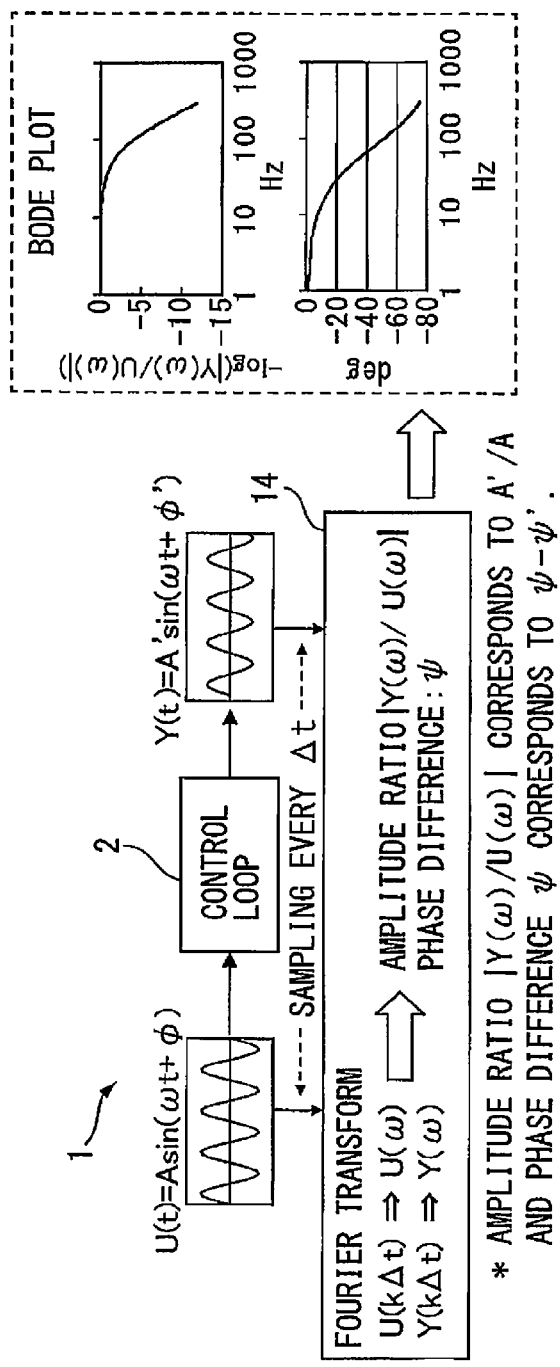
FIG. 2A is an explanatory view which shows a routine by which the numerical control device which is shown in FIG. 1A calculates a frequency response of a control loop.

Here, a routine for calculating the frequency response (frequency characteristic) of the control loop 2 in the numerical control device 1 which is shown in FIG. 1A and expressing it as a Bode plot will be explained using FIG. 2A. The routine for calculating the frequency characteristic of the control loop 2 and expressing it as a Bode plot is provided with the following steps (1) to (5).

(1) First, an input signal U(t) of the frequency f($\omega=2\pi f$) which was generated by the sine wave generation part is input to the control loop 2.

(2) Next, the input signal U(t) and an output signal Y(t) which is output from the control object 3 when this input signal U(t) is input to the control loop 2 are sampled every sampling period $\Delta t$ by the data acquisition part and input to the frequency characteristic calculation part 14.

(3) In the frequency characteristic calculation part 14, the inputted input signal U(k$\Delta t$) and output signal Y(k$\Delta t$) are transformed by a Fourier transform to the functions U($\omega$) and Y($\omega$) of the frequency region $\omega$.

(4) After this, the frequency characteristic calculation part 14 calculates an amplitude ratio $|Y(\omega)/U(\omega)|$ and a phase difference $\psi$ from the input signal U($\omega$) and the output signal Y($\omega$).

(5) In the numerical control device 1, the processing from (1) to (4) is repeated while changing the frequency f($\omega=2\pi f$) of the input signal U(t) which is input from the sine wave generation part to the control loop 2. The frequency characteristic calculation part 14 prepares a Bode plot from the amplitude ratio $|Y(\omega)/U(\omega)|$ and the phase difference $\psi$ for each frequency.

In this way, if inputting a sinusoidal signal to the control loop 2 and exciting the control loop 2 while gradually changing the frequency of the input signal from the minimum frequency to maximum frequency in the measurement region, a Bode plot can be prepared from the relationship of the input signal U(t) of the control loop 2 and the output signal Y(t) of the control object 3. Further, it is possible to analyze the frequency response of the control loop 2 based on the Bode plot and to adjust the parameters (integral gain, proportional gain, etc.) of the control loop 2 based on the results of analysis to give the desired frequency response.

Figure 1B:
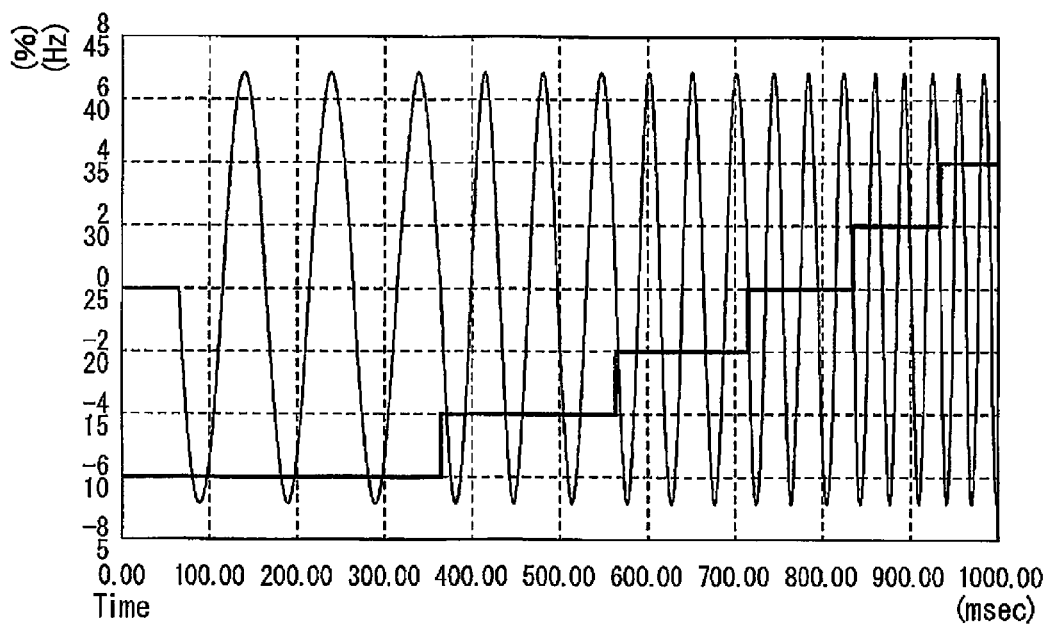
FIG. 1B is a waveform diagram of a sinusoidal signal which a sine wave generation part of the numerical control device which is shown in FIG. 1A generates.

Note that, when inputting a sinusoidal signal to the control loop 2 to excite it, as shown in FIG. 1B, the frequency "f" ($\omega=2\pi f$) of the input signal is gradually increased for measurement. The frequency of the sine wave constituted by the input signal, as shown in FIG. 1B by the step-like solid line, is made to increase by a predetermined frequency every predetermined period of the sine wave. In the example which is shown in FIG. 1B, the frequency is made to increase 5 Hz at a time every 3 periods and 3 periods worth of data is acquired every frequency. The acquired 3 periods worth of data (input signal and output signal) is as explained above transformed by a Fourier transform. The absolute value of the amplitude ratio and phase delay at a predetermined frequency f($\omega=2\pi f$) are calculated.

Figure 2B:
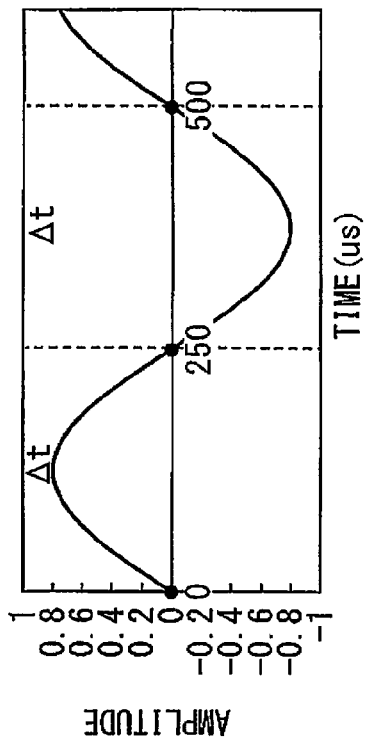
FIG. 2B is a waveform diagram which explains the problem in the numerical control device which is shown in FIG. 1A.

FIG. 2B shows the sampling points when sampling the input signal of a sine wave of a frequency "f"=2000 Hz at a sampling frequency fs=4000 Hz ($\Delta t$=250 µs). When calculating the frequency characteristic of the control loop 2 in the numerical control device 1 which is shown in FIG. 1A, the input frequency "f" to the control loop 2 matches with the Nyquist frequency (fs/2). When the initial phase of the input signal is 0 deg, the sampled data always becomes 0, so the frequency characteristic at 2000 Hz cannot be evaluated.

Further, when the input signal includes a frequency component of the Nyquist frequency (fs/2) or more, sampling of two or more points per period is not possible, so it is not possible to reproduce an analog signal from a digital signal. For this reason, in the method of calculation of the frequency characteristic of the control loop 2 in numerical control device of the comparative art, it was not possible to precisely evaluate the frequency characteristic of the Nyquist frequency (fs/2) or higher high frequency region.

Figure 3:
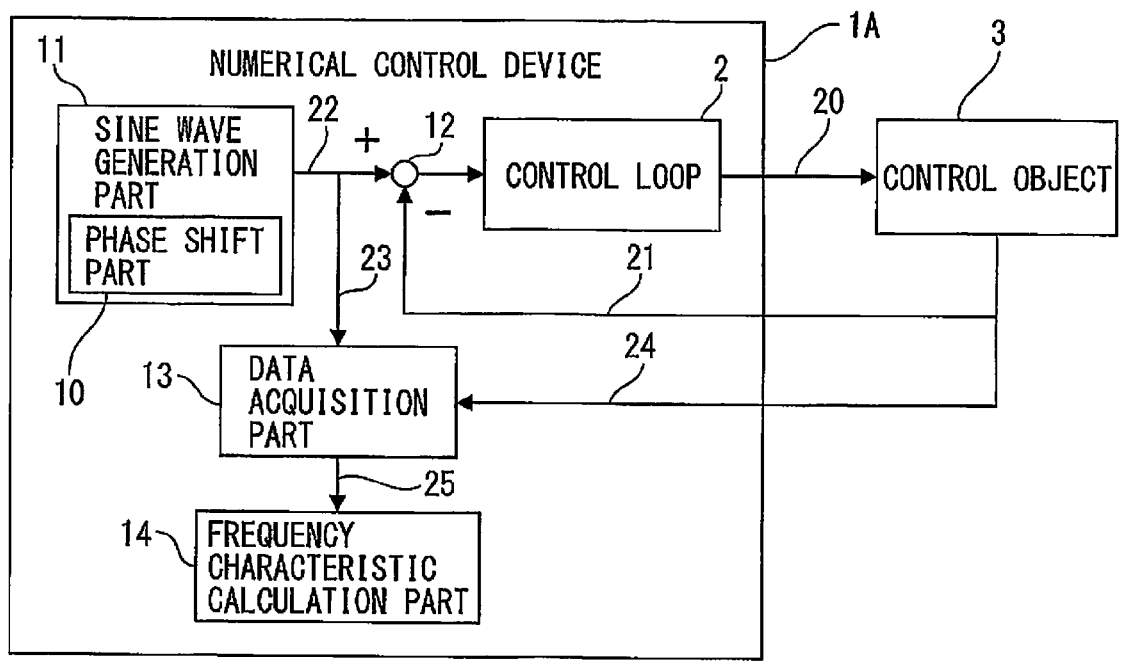
FIG. 3 is a block diagram of an embodiment of a numerical control device of the present invention.

The present invention solves the problem of the method of calculation of the frequency characteristic of the control loop in the numerical control device of the comparative art. FIG. 3 shows one embodiment of the numerical control device 1A of the present invention by a block diagram. The numerical control device 1A of the present embodiment is provided with parts for calculating the frequency characteristic of the control loop 2 such as a sine wave generation part 11, control loop excitation part 12, data acquisition part 13, and frequency characteristic calculation part 14. The configurations and connections of these are the same as the numerical control device 1 of the comparative art explained in FIG. 1A except for the configuration of the sine wave generation part 11. The same component members are assigned the same reference notations and explanations thereof will be omitted. In this embodiment as well, the numerical control device 1A controls a single control object 3, but there may also be a plurality of control objects 3.

The numerical control device 1A of the present invention which is shown in FIG. 3 is provided with a phase shift part 10 at the sine wave generation part 11. This point differs from the numerical control device 1 of the comparative art which is shown in FIG. 1A. The phase shift part 10 can shift the phase of a sinusoidal signal of the same frequency from the initial phase by exactly a certain amount. For example, it can shift the sinusoidal signal from the initial phase by exactly $2\pi/n$ ("n" is an integer) at a time. The value of "n" can be made for example 3. Note that, in the present embodiment, the phase shift part 10 is built into the sine wave generation part 11, but the phase shift part 10 can also be provided outside of the sine wave generation part 11.

Further, by inputting a sinusoidal signal shifted from the initial phase by exactly a certain amount (for example, $2\pi/n$ at a time) to the control loop 2 "k" number of times, it is possible to sample at least "k" number of points per 1 period, so it is possible to precisely calculate the frequency characteristic even with a high frequency or short time measurement. Here, the series of steps of the flow until calculation of the amplitude ratio $|Y(j\omega)/U(j\omega)|$ and the phase difference $\psi$ from the input signal when inputting a sinusoidal signal of the amplitude A and frequency $f(\omega=2\pi f)$ shifted from the initial phase by $2\pi/3$ each to the control loop 2 three times and the output signals which are output from the control object 3 will be explained using FIG. 4A. Further, the calculation formulas of the real component $R_\omega$ and the imaginary component $I_\omega$ are shown in formula 1 and formula 2.

FIG. 4A shows the routine for the numerical control device 1A of the present invention to calculate the frequency response of the control loop 2. In the numerical control device 1A, first, the input signal U(t) which has the frequency $f(\omega=2\pi f)$ and a predetermined phase as the initial phase and which was generated at the sine wave generation part 11 is input to the control loop 2. Further, the sampled input signal $U(k\Delta t)$ and output signal $Y(k\Delta t)$ of the input signal U(t) and the output signal Y(t) which is output from the control object 3 when the input signal U(t) is input to the control loop 2 are input to the frequency characteristic calculation part 14.

Next, an input signal $U(t-\frac{2}{3}\times\pi/\omega)$ of the same frequency "f" but shifted in phase from the initial phase by $\frac{2}{3}\pi$ is input to the control loop 2. Further, the sampled input signal $U(k\Delta t-\frac{2}{3}\times\pi/\omega)$ and output signal $Y(k\Delta t-\frac{2}{3}\times\pi/\omega)$ of the input signal $U(t-\frac{2}{3}\times\pi/\omega)$ and the output signal $Y(t-\frac{2}{3}\times\pi/\omega)$ which is output from the control object 3 when the input signal $U(t-\frac{2}{3}\times\pi/\omega)$ is input to the control loop 2 are input to the frequency characteristic calculation part 14.

Furthermore, an input signal $U(t+\frac{2}{3}\times\pi/\omega)$ which has the same frequency "f" but has a phase which is shifted from the initial phase by $-\frac{2}{3}\pi$ is input to the control loop 2. Further, the sampled input signal $U(k\Delta t+\frac{2}{3}\times\pi/\omega)$ and output signal $Y(k\Delta t+\frac{2}{3}\times\pi/\omega)$ of the input signal $U(t+\frac{2}{3}\times\pi/\omega)$ and the output signal $Y(t+\frac{2}{3}\times\pi/\omega)$ which is output from the control object 3 when the input signal $U(t+\frac{2}{3}\times\pi/\omega)$ is input to the control loop 2 are input to the frequency characteristic calculation part 14.

The detailed calculation formulas of the input signals $U(k\Delta t)$, $U(k\Delta t-\frac{2}{3}\times\pi/\omega)$, and $U(k\Delta t+\frac{2}{3}\times\pi/\omega)$ which are input to the frequency characteristic calculation part 14 and the output signals $Y(k\Delta t)$, $Y(k\Delta t-\frac{2}{3}\times\pi/\omega)$, and $Y(k\Delta t+\frac{2}{3}\times\pi/\omega)$ are shown in FIG. 4B and FIG. 4C.

The sampled input signals $U(k\Delta t)$, $U(k\Delta t-\frac{2}{3}\times\pi/\omega)$, and $U(k\Delta t+\frac{2}{3}\times\pi/\omega)$ and output signals $Y(k\Delta t)$, $Y(k\Delta t-\frac{2}{3}\times\pi/\omega)$, and $Y(k\Delta t+\frac{2}{3}\times\pi/\omega)$ are transformed at the frequency characteristic calculation part 14 by Fourier transforms.

Here, if making the input signal U(s) and making the output signal Y(s), the transfer function G(s) is expressed by formula 1.

$$G(s)=Y(s)/U(s)=L[Y(t)]/L[U(t)] \quad (1)$$

Further, if entering $s=j\omega$ into formula 1, the denominator and numerator are expressed by complex numbers as shown in formula 2.

$$G(s)=Y(j\omega)/U(j\omega)=(x_2+j\cdot y_2)/(x_1+j\cdot y_1) \quad (2)$$

The numerator and the denominator become values at the time of transformation of the input signal U(t) and the output signal Y(t) by Fourier transforms at $f=\omega/2\pi$, so it will be understood that the following formula 3, formula 4, formula 5, and formula 6 correspond to $x_1$, $y_1$, $x_2$, and $y_2$.

$$x_1 = \frac{1}{N}\sum_{k=0}^{N-1}\left(\begin{array}{l} U(k\Delta t+\varphi)\cdot\cos(\omega k\Delta t) + U\left(k\Delta t-\frac{2}{3}\pi\cdot\frac{1}{\omega}+\varphi\right)\cdot \\ \cos\omega\left(k\Delta t-\frac{2}{3}\pi\cdot\frac{1}{\omega}\right) + U\left(k\Delta t+\frac{2}{3}\pi\cdot\frac{1}{\omega}+\varphi\right)\cdot \\ \cos\omega\left(k\Delta t+\frac{2}{3}\pi\cdot\frac{1}{\omega}\right) \end{array}\right) \quad (3)$$

$$y_1 = \frac{1}{N}\sum_{k=0}^{N-1}\left(\begin{array}{l} U(k\Delta t+\varphi)\cdot\sin(\omega k\Delta t) + U\left(k\Delta t-\frac{2}{3}\pi\cdot\frac{1}{\omega}+\varphi\right)\cdot \\ \sin\omega\left(k\Delta t-\frac{2}{3}\pi\cdot\frac{1}{\omega}\right) + U\left(k\Delta t+\frac{2}{3}\pi\cdot\frac{1}{\omega}+\varphi\right)\cdot \\ \sin\omega\left(k\Delta t+\frac{2}{3}\pi\cdot\frac{1}{\omega}\right) \end{array}\right) \quad (4)$$

$$x_2 = \frac{1}{N}\sum_{k=0}^{N-1}\left(\begin{array}{l} Y(k\Delta t+\varphi)\cdot\cos(\omega k\Delta t) + Y\left(k\Delta t-\frac{2}{3}\pi\cdot\frac{1}{\omega}+\varphi\right)\cdot \\ \cos\omega\left(k\Delta t-\frac{2}{3}\pi\cdot\frac{1}{\omega}\right) + Y\left(k\Delta t+\frac{2}{3}\pi\cdot\frac{1}{\omega}+\varphi\right)\cdot \\ \cos\omega\left(k\Delta t+\frac{2}{3}\pi\cdot\frac{1}{\omega}\right) \end{array}\right) \quad (5)$$

$$y_2 = \frac{1}{N}\sum_{k=0}^{N-1}\left(\begin{array}{l} Y(k\Delta t+\varphi)\cdot\sin(\omega k\Delta t) + Y\left(k\Delta t-\frac{2}{3}\pi\cdot\frac{1}{\omega}+\varphi\right)\cdot \\ \sin\omega\left(k\Delta t-\frac{2}{3}\pi\cdot\frac{1}{\omega}\right) + Y\left(k\Delta t+\frac{2}{3}\pi\cdot\frac{1}{\omega}+\varphi\right)\cdot \\ \sin\omega\left(k\Delta t+\frac{2}{3}\pi\cdot\frac{1}{\omega}\right) \end{array}\right) \quad (6)$$

For this reason, the real component $R_\omega$ and the imaginary component $I_\omega$ can be found by entering formula 3, formula 4, formula 5, and formula 6 into formula 8 and formula 9 of the real part and imaginary part when rationalizing the denominator of formula 2.

$$G(s) = \frac{Y(j\omega)}{U(j\omega)} = \frac{x_2 + j \cdot y_2}{x_1 + j \cdot y_1} = \frac{x_1 \cdot x_2 + y_1 \cdot y_2}{x_1^2 + y_1^2} + j \cdot \frac{x_1 \cdot y_2 - x_2 \cdot y_1}{x_1^2 + y_1^2} \quad (7)$$

$$R_\omega = \frac{x_1 \cdot x_2 + y_1 \cdot y_2}{x_1^2 + y_1^2} \quad (8)$$

$$I_\omega = \frac{x_1 \cdot y_2 - x_2 \cdot y_1}{x_1^2 + y_1^2} \quad (9)$$

(Formula 3, formula 4, formula 5, and formula 6 can be entered into $x_1$, $y_1$, $x_2$, and $y_2$ respectively.)

Here, T is the measurement time, $\Delta t$ is the sampling time, and $N=T/\Delta t$.

Further, the real component $R_\omega$ and the imaginary component $I_\omega$ can be entered into the following formula 10 and formula 11 to calculate the absolute value of the amplitude ratio and the phase delay.

$$\left| \frac{Y(\omega)}{U(\omega)} \right| = \sqrt{R_\omega^2 + I_\omega^2} \quad (10)$$

$$\psi = \tan^{-1}\left(-\frac{I_\omega}{R_\omega}\right) \quad (11)$$

Figure 5A:
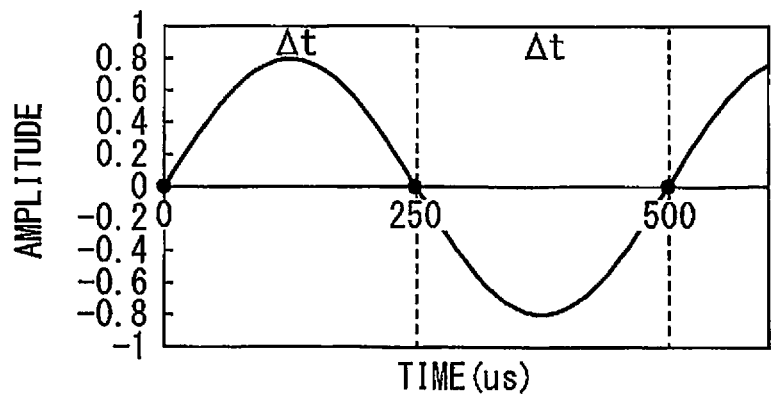
FIG. 5A is a waveform diagram which shows a sinusoidal signal which has the initial phase which is output from the sine wave generation part which is shown in FIG. 3 as an initial phase and sampling points.
Figure 5B:
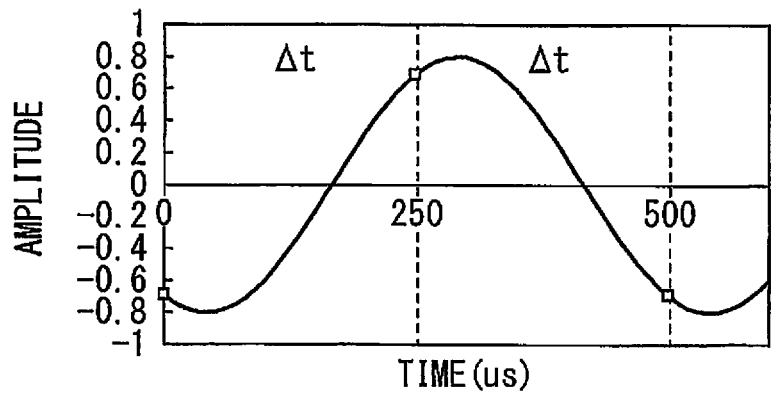
FIG. 5B is a waveform diagram which shows a sinusoidal signal which is shifted by $2/3\pi$ from the initial phase which is output from the sine wave generation part which is shown in FIG. 3 and sampling points.
Figure 5C:
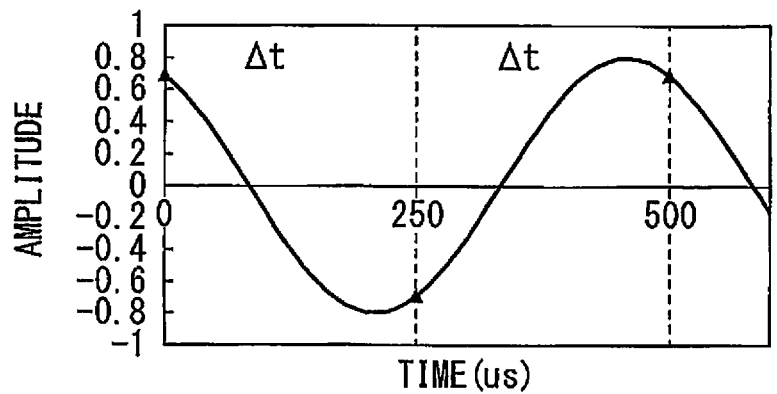
FIG. 5C is a waveform diagram which shows a sinusoidal signal which is shifted by $-2/3\pi$ from the initial phase which is output from the sine wave generation part which is shown in FIG. 3 and sampling points.

FIG. 5A shows the sampling points when inputting a sinusoidal signal of a frequency f=2000 Hz as the input signal $U(k\Delta t)$ to the control loop 2 and sampling the output signal $Y(k\Delta t)$ from the control object 3 at fs=4000 Hz ($\Delta t$=250 μs). Further, FIG. 5B shows the sampling points when inputting a sinusoidal signal of the same frequency f=2000 Hz but shifted $\frac{2}{3}\pi$ from the initial phase as the input signal $U(k\Delta t-\frac{2}{3}\times\pi/\omega)$ to the control loop 2 and sampling the output signal $Y(k\Delta t-\frac{2}{3}\times\pi/\omega)$ from the control object 3 at fs=4000 Hz ($\Delta t$=250 μs). Furthermore, FIG. 5C shows the sampling points when inputting a sinusoidal signal of the same frequency f=2000 Hz but shifted $-\frac{2}{3}\pi$ from the initial phase as the input signal $U(k\Delta t+\frac{2}{3}\times\pi/\omega)$ to the control loop and sampling the output signal $Y(k\Delta t+\frac{2}{3}\times\pi/\omega)$ from the control object 3 at fs=4000 Hz ($\Delta t$=250 μs).

Figure 5D:
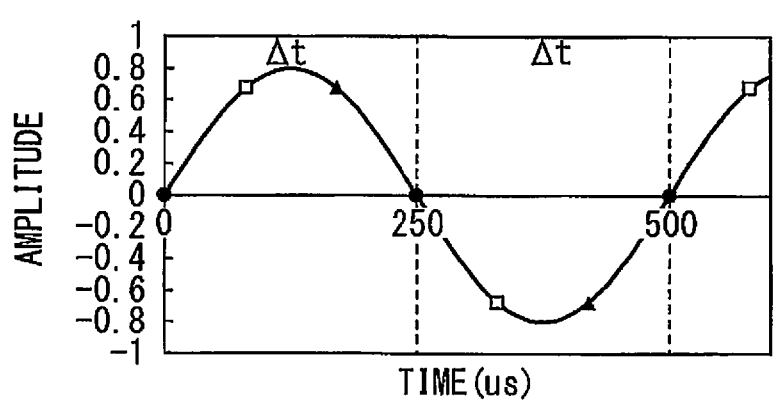
FIG. 5D is a waveform diagram which shows sampling points in a sine wave of the same frequency which is acquired by the data acquisition part which is shown in FIG. 3.

If inputting an input signal of a sine wave having a predetermined phase as its initial phase and a plurality input signals of sine waves shifted from the initial phase to the control loop 2, the points of sampling the sine wave shaped output signals from the control object 3 will shift. For this reason, as shown in FIG. 5D, it is possible to sample data of different phases on a sine wave of the same frequency f=2000 Hz. By considering the sampling points after shifting in this way, the result becomes the same as when sampling data in most phases of the sinusoidal signal of the same frequency. As a result, as shown in FIG. 5A, it becomes possible to precisely measure the frequency characteristic when the frequency "f" of the input signal and the Nyquist frequency (fs/2) match or even with an input signal of the Nyquist frequency (fs/2) or more.

Here, the flow chart which is shown in FIG. 6 will be used to explain an embodiment of the operation of the numerical control device 1A which is shown in FIG. 3. At step 601, the sine wave generation part 11 generates a plurality of sinusoidal signals which are shifted from the initial phase by exactly a certain amount. The sinusoidal signals include a sinusoidal signal which has a predetermined phase as the initial phase. Further, a sinusoidal signal which is shifted by exactly a certain amount, as explained above, means a sinusoidal signal which is shifted in phase from the initial phase by $\frac{2}{3}\pi$ or a sinusoidal signal which is shifted in phase from the initial phase by $-\frac{2}{3}\pi$.

At the next step 602, the control loop excitation part 12 performs processing to input a sinusoidal signal to the control loop 2 a plurality of times. The "input a plurality of times", for example, is processing where when the signals which the sine wave generation part 11 generates are the three types of the sinusoidal signal having a predetermined phase as the initial phase and sinusoidal signals having phases shifted from the initial phase by $\frac{2}{3}\pi$ and $-\frac{2}{3}\pi$, the three types of sinusoidal signals are respectively input to the control loop 2 a plurality of times of one time each. Note that, the three types of sinusoidal signals may be respectively input a plurality of times of two times or more each.

At the next step 603, the data acquisition part 13 acquires the sinusoidal signal which is input to the control loop 2 (input signal) and the output signal from the control object 3. The data acquisition part 13 acquires the three types of sinusoidal signals which are input to the control loop 2 of the sinusoidal signal having a predetermined phase as the initial phase and sinusoidal signals having phases shifted from the initial phase by $\frac{2}{3}\pi$ and $-\frac{2}{3}\pi$ and the three types of output signals which are output from the control object 3 for the input signals of these three types of sinusoidal signals.

In the final step 604, the frequency characteristic calculation part 14 uses the input signal and the output signal to calculate the frequency characteristic of the control loop 2. The frequency characteristic calculation part 14 uses the three types of sinusoidal signals which are input to the control loop 2, that is, the sinusoidal signal which has the predetermined phase as an initial phase and the sinusoidal signals which have phases shifted from initial phase by $\frac{2}{3}\pi$ and $-\frac{2}{3}\pi$, and the three types of output signals which are output from the control object 3 corresponding to the input signals of the three types of sinusoidal signals to calculate the frequency characteristic of the control loop 2.

In this way, a comparison of the case of using the sinusoidal signal shifted from the initial phase by $2\pi/3$ at a time to calculate the frequency characteristic of the control loop and the case of using only the sinusoidal signal not shifted from the initial phase to calculate the frequency characteristic of the control loop will be explained using FIG. 7A and FIG. 7B.

Figure 7A:
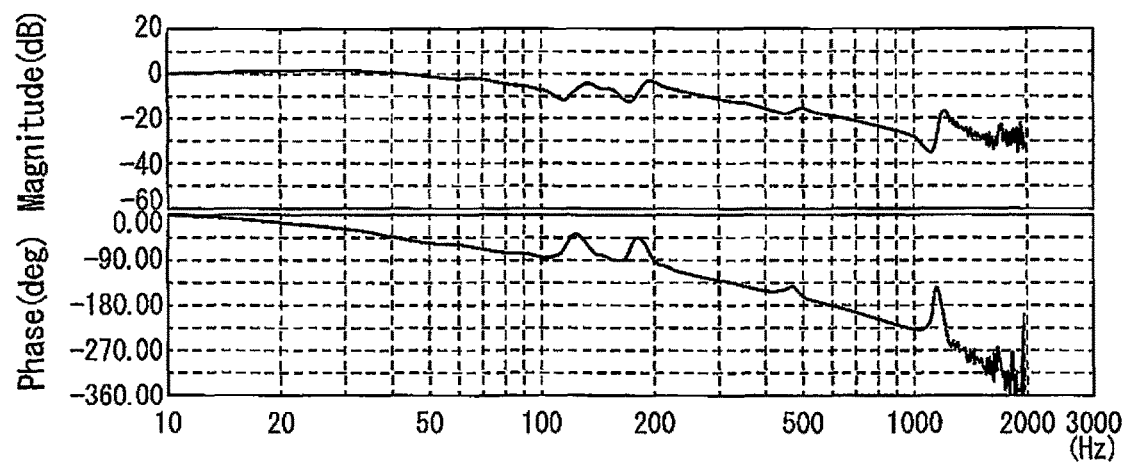
FIG. 7A is a waveform diagram which shows the frequency characteristic when the numerical control device which is shown in FIG. 3 inputs a sinusoidal signal having a predetermined phase as the initial phase to the control loop just once without shifting.

FIG. 7A is a Bode plot which shows the frequency characteristic when the numerical control device 1A which is shown in FIG. 3 inputs the sinusoidal signal having the predetermined phase as the initial phase to the control loop 2 exactly one time without shifting it. The sampling frequency fs was 4000 Hz, the Nyquist frequency fb (=fs/2) was 2000 Hz, and the frequency "f" of the input sinusoidal signal was made 10 to 3000 Hz. With the frequency characteristic at the time of inputting the sinusoidal signal having the predetermined phase as the initial phase to the control loop 2 just once without shifting, it is learned that the detection precision at the 1000 Hz or more high frequency region is no good.

Figure 7B:
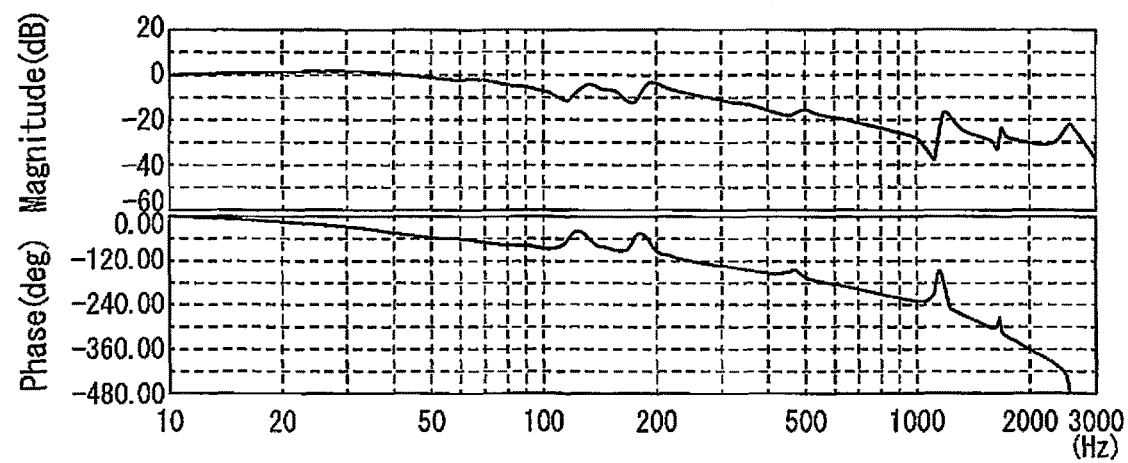
FIG. 7B is a waveform diagram which shows the frequency characteristic when the numerical control device which is shown in FIG. 3 inputs a sinusoidal signal having a predetermined phase as the initial phase and a sinusoidal signal which shifts the initial phase two times by $\frac{2}{3}\pi$ each to the control loop.

FIG. 7B is a Bode plot which shows the frequency characteristic when the numerical control device 1A which is shown in FIG. 3 inputs the three types of sinusoidal signals of the sinusoidal signal having the predetermined phase as the initial phase and the two sinusoidal signals which shift the initial phase by $\frac{2}{3}\pi$ each to the control loop 2. In this case, the sinusoidal signal is input to the control loop 2 three times. The sampling frequency fs is 4000 Hz, the Nyquist frequency fb is 2000 Hz, and the frequency "f" of the input sinusoidal signal is 10 to 3000 Hz. When shifting the initial phase by $2\pi/3$ each and inputting the sinusoidal signal three times, it is learned that the detection precision is improved in the high frequency region.

On the other hand, if comparing the Bode plots which show the frequency characteristics which are shown in FIG. 7A and FIG. 7B, when the frequency of the input signal is lower than 1000 Hz, it is learned that there is almost no difference between the case of inputting a sinusoidal signal one time to the control loop 2 and inputting it three times. That is, in the frequency region lower than the predetermined frequency, even if inputting the initial phase sinusoidal signal just one time, without shifting, to the control loop 2 to calculate the frequency characteristic or inputting the sinusoidal signal shifted in phase three times to calculate the frequency characteristic, it will be understood that similar measurement results can be obtained.

Therefore, when the frequency of the input signal is lower than a predetermined frequency (for example, Nyquist frequency), it is possible to input the initial phase sinusoidal signal just one time while not shifting it to the control loop 2 to calculate the frequency characteristic. Further, if the frequency of the input signal is higher than a predetermined frequency (for example, Nyquist frequency), a sinusoidal signal which is shifted from the initial phase by exactly a certain amount is input "k" number of times to the control loop to calculate the frequency characteristic. According to this method of calculation of the frequency characteristic, compared with the case of inputting a plurality of types of sinusoidal signals shifted in phase without regard as to the frequency of the input signal a plurality of times to the control loop 2, the signals are input a plurality of times for only the frequency required for the number of data points, so it becomes possible to measure the frequency characteristic in a short time.

Note that, in the above obtained embodiment, the case of inputting sinusoidal signals shifted from the initial phase by a certain amount (for example, $2\pi/n$ each) to the control loop "k" number of times to enable sampling of at least "k" number of points per 1 period was explained. In this case, if "n"="k" and shifting the sinusoidal signal "n" number of times, the result becomes 1 period. However, for example, even if inputting a sinusoidal signal shifted by exactly $\pi/2$ two times, it is believed that effect of the present invention will be explained. In this case, "n"≠"k", so the present invention includes the case where "n"≠"k" as well.

Above, the present invention will be explained with reference to preferred embodiments, but a person skilled in the art will understand that it can be modified and changed in various ways without departing from the scope of disclosure of the later explained claims.

What is claimed is:

1. A numerical control device which controls at least one control object, the numerical control device comprising:
   a sine wave generation part which generates a sinusoidal signal;
   a control loop excitation part which inputs the sinusoidal signal which is output from said sine wave generation part to a control loop of said control object;
   a data acquisition part which samples an input signal which is input to said control loop and an output signal which said control object outputs at a certain period;
   a frequency characteristic calculation part which uses the sampling data of the input signal and output signal to calculate the frequency characteristic of said control loop; and
   a phase shift part which shifts the phase of said sinusoidal signal,
   wherein the numerical control device is configured to
      perform an analysis of the frequency characteristic of the control loop calculated by the frequency characteristic calculation part, and
      adjust parameters of the control loop based on a result of the analysis to control the control object, and
   wherein the numerical control device is configured to obtain the sampling data of different phases on the sinusoidal signal by inputting
      a base sinusoidal signal having, at a frequency, an initial phase and
      at least one phase-shifted sinusoidal signal having, at said frequency, a phase shifted from the initial phase by a certain amount respectively, into said control loop a plurality of times to enable said frequency characteristic calculation part to calculate the frequency characteristic of said control loop.

2. The numerical control device according to claim 1, wherein
   said phase shift part is configured to generate a sinusoidal signal which is shifted from the initial phase by exactly $2\pi/n$ at a time,
   said control loop excitation part is configured to input the sinusoidal signal which is shifted from the initial phase by exactly $2\pi/n$ at a time to said control loop, and
   said frequency characteristic calculation part is configured to use data which is input "k" number of times to said control loop to calculate the frequency characteristic of said control loop.

3. The numerical control device according to claim 1, wherein
   said phase shift part is configured to generate "k" number of types of sinusoidal signals which are shifted from the initial phase by exactly $2\pi/n$ at a time,
   said control loop excitation part is configured to input said "k" number of types of sinusoidal signals which are shifted from the initial phase by exactly $2\pi/n$ at a time one time each at said control loop, and
   said frequency characteristic calculation part is configured to use the data which was input "k" number of times to said control loop to calculate the frequency characteristic of said control loop.

4. The numerical control device according to claim 3, wherein
   said phase shift part is configured to generate a first phase-shifted sinusoidal signal which is shifted from the initial phase by $2\pi/3$ and a second phase-shifted sinusoidal signal which is shifted by $-2\pi/3$,
   said control loop excitation part is configured to input, into said control loop, three types of sinusoidal signals including
      the base sinusoidal signal which has the initial phase,
      the first phase-shifted sinusoidal signal where the initial phase is shifted by $2\pi/3$, and
      the second phase-shifted sinusoidal signal where the initial phase is shifted by $-2\pi/3$, and
   said frequency characteristic calculation part is configured to use said three types of sinusoidal signals which are input to said control loop to calculate the frequency characteristic of said control loop.

5. The numerical control device according to claim 1, wherein
   when the frequency of the input signal is lower than a predetermined frequency,
      said control loop excitation part is configured to input the base sinusoidal signal having the initial phase exactly once to said control loop, and said frequency characteristic calculation part is configured to use sampling data of the input signal and output signal to calculate the frequency characteristic of said control loop, and when the frequency of the input signal is said predetermined frequency or more, said control loop excitation part is configured to input, into said control loop, the base sinusoidal signal having the initial phase and a phase-shifted sinusoidal signal which is shifted from the initial phase a plurality of times, and said frequency characteristic calculation part is configured to use sampling data of the plurality of input signals and the plurality of output signals corresponding to said plurality of input signals to calculate the frequency characteristic of said control loop.

6. The numerical control device according to claim 5, wherein said predetermined frequency is the Nyquist frequency.

* * * * *